United States Patent
Yang

(10) Patent No.: US 9,478,002 B2
(45) Date of Patent: Oct. 25, 2016

(54) VERTEX PARAMETER DATA COMPRESSION

(71) Applicant: Imagination Technologies Limited, Kings Langley (GB)

(72) Inventor: Xile Yang, Rickmansworth (GB)

(73) Assignee: Imagination Technologies Limited, Kings Langley (GB)

( * ) Notice: Subject to any disclaimer, the term of this patent is extended or adjusted under 35 U.S.C. 154(b) by 0 days.

(21) Appl. No.: 14/268,162

(22) Filed: May 2, 2014

(65) Prior Publication Data

US 2014/0354666 A1  Dec. 4, 2014

(30) Foreign Application Priority Data

May 9, 2013 (GB) .................................. 1308298.7

(51) Int. Cl.
| | |
|---|---|
| G06T 15/00 | (2011.01) |
| G06T 1/60 | (2006.01) |
| G06T 9/00 | (2006.01) |
| H04N 19/50 | (2014.01) |

(52) U.S. Cl.
CPC ................ *G06T 1/60* (2013.01); *G06T 9/005* (2013.01); *H04N 19/50* (2014.11)

(58) Field of Classification Search
None
See application file for complete search history.

(56) References Cited

U.S. PATENT DOCUMENTS

| | | |
|---|---|---|
| 2003/0123545 A1 | 7/2003 | Prakash et al. |
| 2008/0175475 A1 | 7/2008 | Sung |

FOREIGN PATENT DOCUMENTS

| | | |
|---|---|---|
| GB | 2483502 A | 3/2012 |

OTHER PUBLICATIONS

Ramanathan et al.,"Impact of vertex clustering on registration-based 3D dynamic mesh coding," Image and Vision Computing, vol. 26, No. 7, pp. 1012-1026, Jul. 2, 2008.

*Primary Examiner* — Yingchun He
(74) *Attorney, Agent, or Firm* — Vorys, Sater, Seymour and Pease LLP; Vincent M DeLuca

(57) ABSTRACT

Methods and computer graphics systems are provided for compressing vertex parameter data. The vertex parameter data comprises a data block comprising data of vertices relating to at least one parameter. The data of each of the vertices includes multiple data segments at respective positions. The data in the data block is analyzed to determine a compression grouping scheme according to which data segments of the vertices are grouped together into segment blocks for compression. The analysis of the data determines a compression grouping scheme which is suited to the distribution of the data in the data block, to thereby improve the compression ratio which can be achieved when compressing the data block.

19 Claims, 8 Drawing Sheets

| Vertex | Segment 7 | Segment 6 | Segment 5 | Segment 4 | Segment 3 | Segment 2 | Segment 1 | Segment 0 |
|---|---|---|---|---|---|---|---|---|
| 1 | 8 | 2 | 4 | 9 | 4 | B | 4 | 0 |
| 2 | 8 | 2 | 4 | 0 | 0 | 2 | 8 | 0 |
| 3 | 8 | 2 | 4 | 0 | 2 | 2 | C | 0 |
| 4 | 8 | 2 | 5 | 6 | D | A | 0 | 0 |
| 5 | 8 | 2 | 5 | 6 | F | A | 4 | 0 |
| 6 | 8 | 2 | 4 | 9 | 4 | F | 0 | 0 |
| 7 | 8 | 2 | 4 | 0 | 2 | 0 | A | 0 |
| 8 | 8 | 2 | 5 | 6 | D | 7 | C | 0 |
| 9 | 8 | 2 | 4 | 8 | 4 | B | 2 | 0 |
| 10 | 8 | 2 | 4 | 2 | 1 | 5 | 6 | 0 |
| 11 | 8 | 2 | 4 | 0 | 2 | 8 | C | 0 |
| 12 | 8 | 2 | 5 | 2 | C | D | 8 | 0 |
| 13 | 8 | 2 | 5 | 6 | D | A | 2 | 0 |
| 14 | 8 | 2 | 4 | 4 | 8 | F | 0 | 0 |
| 15 | 8 | 2 | 4 | 0 | 2 | 2 | C | 0 |
| 16 | 8 | 2 | 4 | 9 | 4 | E | 0 | 0 |

| Vertex | Segment 7 | Segment 6 | Segment 5 | Segment 4 | Segment 3 | Segment 2 | Segment 1 | Segment 0 |
|--------|-----------|-----------|-----------|-----------|-----------|-----------|-----------|-----------|
| Header | 8 | 2 | 4 | 9 | 4 | B | 4 | 0 |
| 1 | 8 | 2 | 4 | 0 | 0 | 2 | 8 | 0 |
| 2 | 8 | 2 | 4 | 0 | 2 | 2 | C | 0 |
| 3 | 8 | 2 | 5 | 6 | D | A | 0 | 0 |
| 4 | 8 | 2 | 5 | 6 | F | A | 4 | 0 |
| 5 | 8 | 2 | 4 | 9 | 4 | F | 0 | 0 |
| 6 | 8 | 2 | 4 | 0 | 2 | 0 | A | 0 |
| 7 | 8 | 2 | 5 | 6 | D | 7 | C | 0 |
| 8 | 8 | 2 | 4 | 8 | 4 | B | 2 | 0 |
| 9 | 8 | 2 | 4 | 2 | 1 | 5 | 6 | 0 |
| 10 | 8 | 2 | 5 | 0 | 2 | 8 | C | 0 |
| 11 | 8 | 2 | 5 | 2 | C | D | 8 | 0 |
| 12 | 8 | 2 | 4 | 6 | D | A | 2 | 0 |
| 13 | 8 | 2 | 4 | 4 | 8 | F | 0 | 0 |
| 14 | 8 | 2 | 4 | 0 | 2 | 2 | C | 0 |
| 15 | 8 | 2 | 4 | 9 | 4 | E | 0 | 0 |
| 16 | 8 | 2 | 4 | 9 | 4 | E | 0 | 0 |

FIGURE 4

| Vertex | Segment 7 | Segment 6 | Segment 5 | Segment 4 | Segment 3 | Segment 2 | Segment 1 | Segment 0 |
|---|---|---|---|---|---|---|---|---|
| 1 | 7 | D | B | F | E | C | 6 | 8 |
| 2 | 7 | D | B | 0 | 0 | E | C | 8 |
| 3 | 7 | D | B | F | F | 3 | F | E |
| 4 | 7 | D | B | F | F | 7 | 8 | 4 |
| 5 | 7 | D | B | F | F | C | E | A |
| 6 | 7 | D | B | F | F | B | 5 | 0 |
| 7 | 7 | D | B | F | F | 8 | 1 | 0 |
| 8 | 7 | D | B | F | F | 1 | 1 | 2 |
| 9 | 7 | D | B | 0 | 0 | B | 7 | E |
| 10 | 7 | D | B | 0 | 1 | 0 | C | A |
| 11 | 7 | D | B | F | F | 9 | C | 6 |
| 12 | 7 | D | B | 0 | 1 | F | 8 | 8 |
| 13 | 7 | D | B | F | E | 7 | E | 4 |
| 14 | 7 | D | B | F | E | C | 5 | A |
| 15 | 7 | D | B | F | F | B | 1 | 0 |
| 16 | 7 | D | B | F | F | 8 | | |

| Vertex | Segment 7 | Segment 6 | Segment 5 | Segment 4 | Segment 3 | Segment 2 | Segment 1 | Segment 0 |
|---|---|---|---|---|---|---|---|---|
| Header | 7 | E | C | 9 | 8 | 0 | 8 | 0 |
| 1 | 7 | E | A | F | 1 | 7 | 8 | C |
| 2 | 7 | E | 8 | 2 | E | 8 | 7 | 4 |
| 3 | 7 | E | 6 | 8 | 8 | 0 | 0 | 0 |
| 4 | 7 | E | 8 | 1 | 5 | 7 | 9 | 4 |
| 5 | 7 | E | B | 0 | A | 8 | 7 | C |
| 6 | 7 | E | C | 9 | 8 | 0 | 0 | 0 |
| 7 | 7 | E | C | 9 | 8 | 0 | 0 | 0 |
| 8 | 7 | E | C | 9 | 8 | 5 | 9 | C |
| 9 | 7 | E | B | 8 | 3 | 4 | 7 | 0 |
| 10 | 7 | E | 8 | B | 1 | 5 | 9 | C |
| 11 | 7 | E | B | 8 | 3 | 8 | 7 | 0 |
| 12 | 7 | E | 8 | 2 | E | 0 | 0 | C |
| 13 | 7 | E | 6 | 8 | 8 | 7 | 9 | 4 |
| 14 | 7 | E | 8 | 1 | 5 | 8 | 0 | 0 |
| 15 | 7 | E | B | 0 | A | 8 | 7 | 4 |
| 16 | 7 | E | — | — | — | — | — | C |

VERTEX PARAMETER DATA COMPRESSION

BACKGROUND

Computer graphics systems (such as three-dimensional (3D) and two-dimensional (2D) computer graphics systems) are used to process data for rendering computer graphics. There is an increasing demand for computer graphics systems to process more complex graphics data with a faster speed of display. One example of a computer graphics system is a tile-based graphics system for rendering 2D or 3D computer graphics images using tile-based rendering. As part of a tile-based rendering technique a rendering space is sub-divided into a plurality of regions called tiles or blocks (herein referred to as "tiles"), which each comprise a plurality of pixels. Tiles are often rectangular, but they may be other shapes such as triangular or hexagonal. The rendering space may correspond to an image for display on a screen, but other render targets, such as texture data in memory, are also possible. Tiles can be various sizes, but as an example, tiles may be 16×16 pixels. In one example of a high screen resolution image there are 1280×1024 pixels. Therefore, as an example, a high screen resolution image may be sub-divided into 5120 tiles (each tile comprising 16×16 pixels).

Tile-based renderers store primitive data representing geometrical objects or other geometry in data blocks (or "primitive blocks") in memory. The primitive data in a primitive block comprises data of a plurality of vertices which relate to one or more parameters to thereby describe the primitives. The data of a vertex may relate to parameters, such as the location of the vertex and a texture that is to be applied to the primitive. As the complexity of the graphics data and the speed of display increase, the amount of vertex parameter data that is used per second in a computer graphics system for rendering images increases. In one example, the vertex parameter data comprises a plurality of 32-bit words of data per vertex, and there may be of the order of a million vertices in a render of a 3D image. So the memory space for the vertex parameter data used in a 3D render can easily reach hundreds of MB.

Because of the amount of vertex parameter data that a computer graphics system processes, the performance of the system may be affected (e.g. limited) by vertex parameter data memory bandwidth, i.e. the bandwidth between a processing unit where the vertex parameter data is processed and the memory where the vertex parameter data is stored. The vertex parameter data memory bandwidth is a particular issue for tile-based 3D computer graphics systems, in which vertex parameter data is written to memory and may be read from the memory multiple times for processing different tiles where vertices from the primitives are needed to perform a render.

As well as the memory bandwidth, the available space in the memory for storing vertex parameter data may be a factor affecting the performance of a 3D computer graphics system.

To address these issues, the vertex parameter data may be compressed. Compressing the vertex parameter data reduces the amount of vertex parameter data written into memory and read from memory and reduces the amount of memory needed to store the vertex parameter data.

Some compression algorithms are lossy and some compression algorithms are lossless. When a lossy compression algorithm is used to compress data then some of the data is lost. For example, the accuracy of data may be reduced due to compression with a lossy compression algorithm. In contrast, when a lossless compression algorithm is used to compress data then no data is lost. That is, when data is compressed with a lossless compression algorithm and then decompressed with a suitable decompression algorithm, the data after the compression and decompression processes is the same as the data before the compression and decompression processes. Data of a vertex relating to at least some of the parameters may be very sensitive to slight changes, and as such to avoid artefacts in a rendered image, a lossless compression algorithm is used to compress the vertex parameter data.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

There is provided a method of compressing vertex parameter data in a computer graphics system. The vertex parameter data comprises a data block comprising data of vertices relating to at least one parameter. The data of each of the vertices includes a plurality of data segments at respective positions. The method comprises analysing the data in the data block to determine a compression grouping scheme for grouping data segments of the vertices into segment blocks for compression. Data segments of the vertices are grouped together according to the determined compression grouping scheme to form a plurality of segment blocks. The compression grouping scheme is determined such that each of the segment blocks includes a plurality of segment sets of one or more data segments of a respective plurality of the vertices, the segment sets having corresponding positions within the data of each of the plurality of the vertices. At least one of the segment blocks is compressed. Subsequent to compressing at least one of the segment blocks, the segment blocks are used to form a compressed data block.

The compression ratio of the compressed data block (i.e. the size of the compressed data block divided by the size of the uncompressed data block) may be improved (i.e. reduced) by analysing a distribution of the data in the data block and grouping the data segments of the vertices together based on the analysis in a manner that allows for greater compression of the data block. Data distributions which are conducive to compression are not necessarily aligned with 8-bit boundaries in the data of the vertices. The analysis of the data may determine a compression grouping scheme which is suited to the distribution of the data in the data block.

According to examples described herein, the segment sets which are grouped together into segment blocks have corresponding positions within the data of each of the plurality of vertices. That is, segment sets of the vertices which have the same significance are grouped together into a segment block. In this way, the most significant data segments of each of the vertices are grouped together into a segment block. Similarly, the least significant data segments of each of the vertices are grouped together into a segment block.

There is provided a computer graphics system comprising a processing unit configured to compress vertex parameter data, wherein the vertex parameter data comprises a data block comprising data of vertices relating to at least one parameter, wherein the data of each of the vertices includes a plurality of data segments at respective positions. The processing unit is configured to: analyse the data in the data block to determine a compression grouping scheme for grouping data segments of the vertices into segment blocks for compression; group together data segments of the vertices according to the determined compression grouping scheme to form a plurality of segment blocks, the compression grouping scheme being determined such that each of the segment blocks includes a plurality of segment sets of one or more data segments of a respective plurality of the vertices, the segment sets having corresponding positions within the data of each of the plurality of the vertices; compress at least one of the segment blocks; and subsequent to compressing at least one of the segment blocks, use the segment blocks to form a compressed data block.

There is provided a data compression unit configured to compress vertex parameter data in a computer graphics system, wherein the vertex parameter data comprises a data block comprising data of vertices relating to at least one parameter, wherein the data of each of the vertices includes a plurality of data segments at respective positions. The data compression unit comprises: an analysis module configured to analyse the data in the data block to determine a compression grouping scheme for grouping data segments of the vertices into segment blocks for compression; a grouping module configured to group together data segments of the vertices according to the determined compression grouping scheme to form a plurality of segment blocks; and a compression module configured to compress at least one of the segment blocks and to use the segment blocks to form a compressed data block, wherein the analysis module is configured to determine the compression grouping scheme such that each of the segment blocks formed by the grouping module includes a plurality of segment sets of one or more data segments of a respective plurality of the vertices, the segment sets having corresponding positions within the data of each of the plurality of the vertices.

There is also provided a method of decompressing (and a computer graphics system comprising a processing unit configured to decompress, and a data decompression unit in a computer graphics system configured to decompress) compressed vertex parameter data which has been compressed using methods described herein.

The above features may be combined as appropriate, as would be apparent to a skilled person, and may be combined with any of the aspects of the examples described herein.

BRIEF DESCRIPTION OF THE DRAWINGS

Examples will now be described in detail by way of reference to the accompanying drawings in which:

FIG. 4 is a first example of vertex parameter data in a data block;

FIG. 5 is a second example of vertex parameter data in a data block;

FIG. 6 is a third example of vertex parameter data in a data block;

Figure 1:
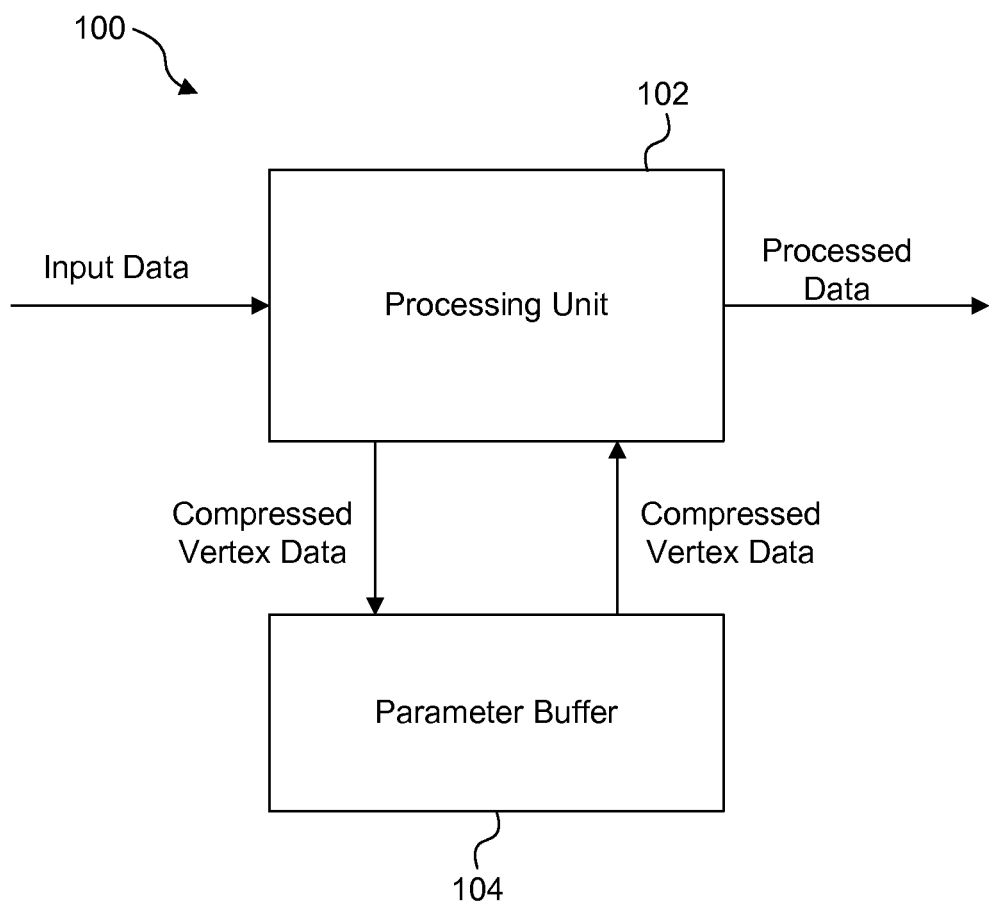
FIG. 1 is a simplified diagram of a computer graphics system.

Common reference numerals are used throughout the figures, where appropriate, to indicate similar features.

DETAILED DESCRIPTION

Embodiments will now be described by way of example only.

FIG. 1 shows a simplified diagram of an example of a computer graphics system 100. The computer graphics system 100 is a 3D tile-based computer graphics system comprising a processing unit 102 which is configured to process data and a parameter buffer 104 for storing data which is situated in system memory in the computer graphics system 100. The system 100 may be implemented on a device, such as a smart phone, tablet, laptop, PC, television, or any other appropriate device in which graphics data is to be processed. The 3D computer graphics system 100 is configured to receive data, e.g. from an application, process the data and provide an output of processed data. The processing unit 102 may be implemented in hardware or software, or a combination thereof. For example, the processing unit 102 may be implemented in fixed-function hardware comprising circuits configured to process data accordingly as described herein. For example, the processing unit 102 may be a Graphics Processing Unit (GPU), a part of a GPU, or may be implemented as a computer program running on a programmable device such as a GPU or a Central Processing Unit (CPU).

An input of the processing unit 102 is arranged to receive input graphics data, e.g. from an application. A first output of the processing unit 102 is coupled to an input of the parameter buffer 104. An output of the parameter buffer 104 is coupled to an input of the processing unit 102. A second output of the processing unit 102 provides processed data as an output, e.g. for display on a display of the device in which the system 100 is operating or for storage in a memory in the device.

The processing unit 102 comprises a plurality of functional blocks for processing data, which are not shown in FIG. 1 for clarity. For example, the processing unit 102 may comprise a tiling unit which, in operation, divides the rendering space into a plurality of tiles, each comprising a plurality of pixels. The tiles may be rectangular (including square), but they could be other shapes such as triangular or hexagonal. The rendering space may correspond to an image for display on a screen, but other render targets, such as texture data in memory, are also possible. The tiling unit of the processing unit 102 is arranged to receive graphics data, e.g. from an application which is currently running on the device on which the system 100 is implemented. The graphics data comprises geometry data which defines objects for display. The tiling unit receives the geometry data and derives a plurality of primitives from the geometry data. The primitives represent geometrical objects or other geometry. The primitives are often polygons, such as triangles, but may have other forms such as lines, points or patches. Data of the vertices of the primitives is used to represent the primitives. The data of a vertex relates to parameters such as the location of the vertex (X, Y and Z values) and other features of the vertex such as colour and texture. The items of vertex data describing the primitives are grouped into data blocks (also referred to herein as "primitive blocks") for storage in memory. Each primitive block contains vertex data describing multiple primitives which may be located in multiple tiles.

For each primitive, the tiling unit of the processing unit 102 determines which of the tiles the primitive is located at least partially within. That is, the tiling unit determines whether at least part of the primitive is located within a viewable region of the tile. This can be done using a number of well-known techniques. In this way, the tiling unit derives a display list, for each tile, comprising identifiers which identify the parameters describing primitives which are located either partially or wholly within the tile. In one implementation, the display list for a tile includes a set of pointers to the primitive blocks which contain geometry at least partially visible within the tile. Each of the pointers includes a mask indicating the subset of vertices from that primitive block that are included in primitives that are present in the tile. In this way, the display list for a tile identifies each of the vertices that are needed to process the tile by providing pointers to the relevant vertices in the primitive block.

The primitive blocks are sent from the processing unit 102 (e.g. from the tiling unit within the processing unit 102) to the parameter buffer 104 for storage therein. Parameter buffer 104 can be implemented using a private memory or a portion of a shared memory allocated to a memory allocation process or unit. In one example, allocations from a shared memory are made as needed.

The processing unit 102 comprises further processing blocks for processing the graphics data. For example, the processing unit 102 comprises an image synthesis processor (ISP) block and a texture and shading processor (TSP) block. The display lists are provided from the tiling unit to the ISP block within the processing unit 102. The ISP block processes each tile in turn. For example, the ISP block implements Hidden Surface Removal (HSR) to thereby remove fragments from the image which will not affect the rendered image before the TSP block processes the tiles. In order to implement HSR for a tile, the ISP block processes the primitives indicated in the tile's display list to determine which are visible and which are hidden. So that the ISP block can process the primitives within a tile, the geometry data of the vertices included in the tile's display list are fetched from the parameter buffer 104. The TSP block processes the tiles to apply texturing and shading to the objects that are visible within the tile. An output from the ISP block is provided to the TSP block within the processing unit 102 to indicate the visible primitives that the TSP block will need in order to process the tiles. So that the TSP block can process the visible primitives within a tile, vertex attribute data used for texturing and shading of the associated primitives included in the tile's display list are fetched from the parameter buffer 104. The TSP block then processes the tile, e.g. by implementing texturing and shading.

The processing unit 102 may include further processing blocks which process the tiles before providing the processed data as the output of the processing unit 102. Details of the processing done by the further processing blocks within the processing unit 102 are beyond the scope of this description, but some of the further processing blocks may fetch vertex parameter data from the parameter buffer 104 in a similar manner to the way in which the ISP block and the TSP block fetch vertex parameter data from the parameter buffer 104, as described above.

Therefore, the vertex parameter data is written from the processing unit 102 (e.g. from the tiling unit) into the parameter buffer 104. Furthermore, the vertex parameter data can be read by the processing unit 102 (e.g. by the ISP and TSP blocks) from the parameter buffer 104 one or more times for processing multiple tiles.

The communication of the vertex parameter data between the processing unit 102 and the parameter buffer 104 may affect the speed with which the processing unit 102 is able to process the graphics data. For example, the parameter buffer 104 may be in the system memory and may not be situated on the same physical chip as the processing unit 102. Communication between the processing unit 102 and the parameter buffer 104 may be very slow compared to other processes that the processing unit 102 can carry out which do not require communication with the system memory. In the examples described herein, the amount of data that is communicated between the processing unit 102 and the parameter buffer 104 is reduced by compressing the vertex parameter data in the processing unit 102 before sending the data to the parameter buffer 104 and decompressing the vertex parameter data in the processing unit 102 that is read from the parameter buffer 104. Therefore, as shown in FIG. 1, the vertex parameter data that is sent in both directions between the processing unit 102 and the parameter buffer 104 is compressed. There are described herein examples of compression and decompression schemes that the processing unit 102 may implement to reduce the amount of data that is communicated between the processing unit 102 and the parameter buffer 104.

Figure 2:
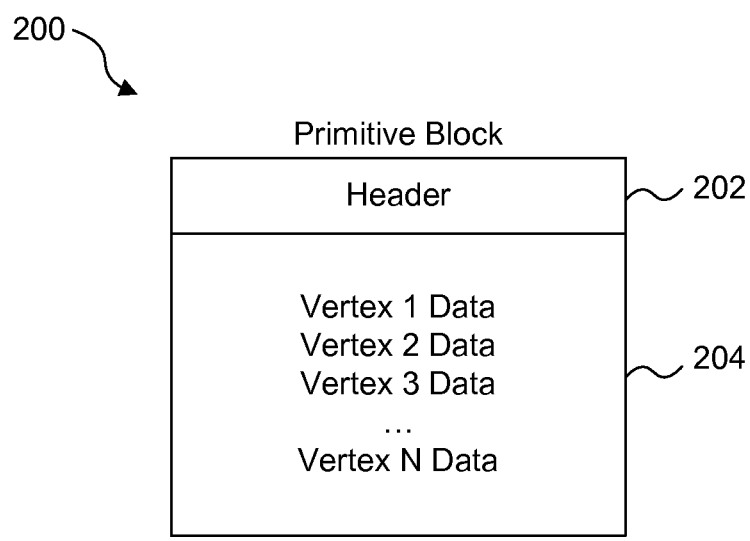
FIG. 2 is a representation of a data block.

In a 3D render, primitives from the application's input data stream are received sequentially in time by the tile-based 3D computer graphics system 100 and after pre-processing are grouped into primitive blocks. Therefore the primitives inside a primitive block are mostly from the same triangle mesh, and the vertex data of primitives in similar locations, e.g. which overlap the same tiles, is grouped together into respective primitive blocks (it is noted that the term "overlap" as used herein is to be understood to mean "at least partially overlap"). It is therefore likely that the data of one vertex within a primitive block is similar to the data of another vertex within that same primitive block. There may be a limit of a maximum number of vertices for which data is contained within a primitive block, which may be for example 64 or 256 vertices. FIG. 2 shows a simplified representation of the data structure of a primitive block 200. The primitive block 200 comprises a header 202 which contains primitive block header data which is used for the definition of vertex parameter data in the primitive block 200, for example to indicate the number of vertices and the number of primitives in the primitive block 200. The primitive block 200 also comprises vertex parameter data 204 which includes data of a plurality of vertices (e.g. N vertices) which are included in the primitive block 200. The data of a vertex in the primitive block 200 may be referenced separately to the data of other ones of the vertices in the primitive block 200. This allows data of a vertex in the primitive block 200 to be referenced for use in processing some tiles and data of other ones of the vertices in the primitive block 200 to be referenced for use in processing other tiles during a 3D render.

The data of a vertex may relate to multiple parameters which describe the vertex. For example, the data of a vertex may comprise X and Y coordinates to indicate a screen location, a Z value to indicate the depth of the vertex and a Reciprocal Homogeneous W (RHW) value used for texturing and shading. A homogenous point given by the values (X, Y, Z, W) defines the location of the vertex in projection space. The data of a vertex may also comprise one or more attribute values which can be used in a programmable shader language (e.g. by a pixel shader) to calculate the colour of a pixel. In particular, vertex attribute data can be used as texture coordinate sets U, V and S, T, colour, normal etc. in a pixel shader. U, V, S and T are texture coordinates used to map textures onto primitives.

The values of vertex parameter data for X, Y, Z, RHW and texture coordinates U, V, S and T may be in floating point format, such as in IEEE floating point format. A value of IEEE floating point has 32 bits (4 bytes), with 8 bits for the exponent and 23 bits for the mantissa plus 1 bit for the sign.

As described above, the primitives inside a primitive block are mostly from the same triangle mesh, and it is unlikely that the data distribution of a vertex parameter data type will be totally random in a primitive block. Patterns in the distribution of the data in the primitive block can be used to compress the vertex parameter data. From a triangle mesh used by an application for an object being modelled, X and Y coordinate values from the vertices should be within a limited range on the display screen. The depth values (Z) of the vertices from the triangle mesh are normally the results of interpolation of a 3D surface from a model, so they are most likely to be in values with gradual changes between each other. In general, for vertices in a primitive block (e.g. from a triangle mesh), the changes between values of the different vertices are likely to be gradual for all of the parameters, e.g. X, Y, Z, RHW, U, V, S and T, which are used to describe the vertices.

Because the display resolution of a computer graphics screen is fixed to a fraction of a pixel unit and X and Y coordinates from primitives rendered on screen are within the limited range, reduced accuracy fixed point format can be used for X and Y values from the original floating point values to save parameter data space. Table 1 shows an example of vertex parameter data using 16 bit fixed point format to represent X and Y coordinates in a primitive block containing data of ten vertices. In this way, the X and Y values can be grouped together into a 32-bit word, whilst the other parameters are each represented by a 32-bit word for each of the vertices.

positions. That is, the data for each of the vertices has the same number of data segments of the same format representing each of the parameters. Therefore, when the data of the vertices are shown together in a table as in Table 1, a column of data segments in the table includes a data segment from each of the vertices relating to the same parameter with the same significance.

Patterns in the distribution of the data in the primitive block may be used by lossless data compression algorithms to compress the data without losing any data. It can be seen in Table 1 that for most of the 32-bit data values in a column over the different vertices included in the primitive block, the most significant bytes (MSBs) are very similar, and are even the same in some cases. For example, the ten vertices listed in Table 1 have the same MSB for the values of Z, RHW, V, S and T. For the MSB of the U values for the ten different vertices there are only three different byte values: 0xBF, 0x3F and 0xBE. The similarity in the MSBs for the 32-bit data values means that the MSBs can be compressed by grouping them together into a "byte block" and then compressing the byte block. However, for the 32-bit data values in a column over the different vertices included in the primitive block, the least significant bytes (LSBs) are not very similar. Therefore, a byte block of LSBs often cannot be compressed as much as a byte block of MSBs. A "byte block" is a group of bytes of data taken from each of the vertices at corresponding positions within the data for the vertices. In other words, a byte block is a column of bytes from Table 1 where the data of the vertices is arranged in rows for the different vertices. UK Patent Publication Number GB2483502 describes compression schemes in which corresponding bytes of the vertex parameter data for different vertices are grouped together into byte blocks, and then at least one of the byte blocks are compressed using a compression algorithm.

TABLE 1

Vertex Data from a Primitive Block.

| Vertex | X and Y  | Z        | RHW     | U       | V       | S        | T        |
|--------|----------|----------|---------|---------|---------|----------|----------|
| 0      | 715B690B | 3F758FB4 | 3D91E402 | BF25A708 | 3F6276E9 | 415E0316 | 418225A2 |
| 1      | 72EE6C1F | 3F76ECC8 | 3D69B094 | BF58DA3B | 3F6276E9 | 41895B47 | 41A401A6 |
| 2      | 747470F7 | 3F748FDF | 3D91D691 | BF25A708 | 3F62FB57 | 415DF274 | 418213F4 |
| 3      | 742D7C00 | 3F76ECE4 | 3D699F55 | BF58DA3B | 3F62FB57 | 418954F6 | 41A3EFF8 |
| 4      | 7737775B | 3F738FB4 | 3D91E402 | 3F25A708 | 3F6276E9 | 415E0316 | 418225A2 |
| 5      | 774C7C00 | 3F74CA8F | 3DCF6776 | BED10AC6 | 3F628536 | 411F0AB4 | 41335B64 |
| 6      | 4B246FA9 | 3F76C92D | 3DCFD561 | BED08833 | 3F6276E9 | 411EEC6F | 41331A27 |
| 7      | 487663C6 | 3F718FDF | 3D91D691 | 3F25A708 | 3F62FB57 | 415DF274 | 418213F4 |
| 8      | 4BCC793B | 3F72CB79 | 3DCF1D82 | BED162ED | 3F62FB57 | 411F335F | 41338770 |
| 9      | 49136B31 | 3F6DCA8F | 3DCF6776 | BED10AC6 | 3F628536 | 411F0AB4 | 41335B64 |

If the 32-bit values for a vertex parameter data component of the vertices in the primitive block are outputted back-to-back then there is usually not a strong pattern in the outputted data. For example the Z values from the primitive block shown in Table 1 may be outputted as: "3F 75 8F B4 3F 76 EC C8 3F 74 8F DF 3F 76 EC E4 3F 73 8F B4 3F 74 CA 8F 3F 76 C9 2D 3F 71 8F DF 3F 72 CB 79 3F 6D CA 8F". The lack of a strong correlation between a byte of the outputted data and the next byte of the outputted data makes it difficult to achieve high compression results for vertex parameter data blocks in a 3D computer graphics system in which the vertex parameter data components are outputted back-to-back for each vertex in a primitive block.

However, the data of each of the vertices adheres to the same format, whereby the data of each of the vertices includes a plurality of hexadecimal data values (which may be referred to herein as "data segments") at respective However, for the hex values of the vertex parameter data in a primitive block, e.g. as shown in Table 1, good data distributions for compression are not necessarily aligned with 8-bit (i.e. byte) boundaries in the data of the vertices. In examples described herein with reference to FIGS. 3 to 6, statistical information is gathered of the hexadecimal values in 4-bit data segments (i.e. half bytes) from the vertex parameter data in a primitive block to find an optimized way of grouping the data segments together into segment blocks (which may have variable sizes) for compression.

Figure 3:
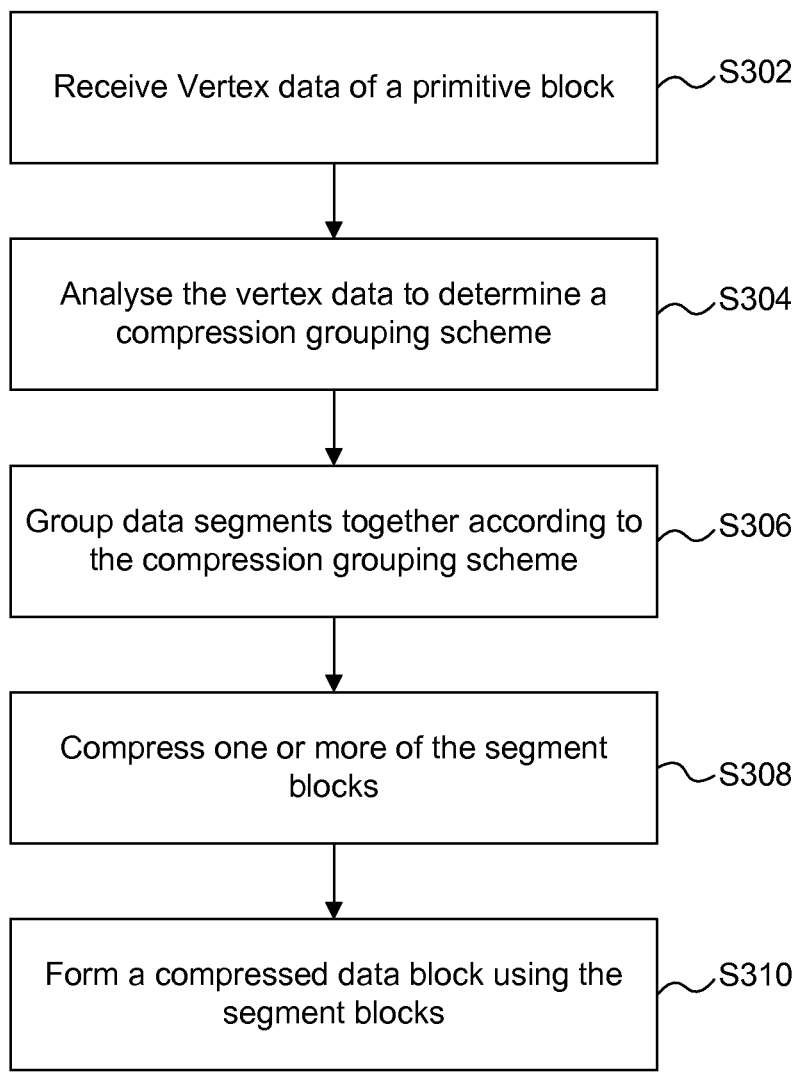
FIG. 3 is a flow chart for a process of compressing vertex parameter data.

FIG. 3 is a flow chart for a method of compressing vertex parameter data included in a primitive block. The method is implemented in the processing unit 102 before the compressed primitive block is sent to the parameter buffer 104, such that compressed vertex data is sent from the processing unit 102 to the parameter buffer 104 as shown in FIG. 1.

As described above, the vertex data for a plurality of primitives are grouped together into a primitive block. In step S302 vertex data of a primitive block is received at a module within the processing unit 102. An example of the data included in a primitive block is shown above in Table 1. Furthermore, FIG. 4 shows a different example in which 32-bit data values of sixteen different vertices relating to one of the parameters (e.g. the Z value) are included in a primitive block 400. The primitive block 400 includes further 32-bit data values of the sixteen different vertices relating to other ones of the parameters (e.g. the X&Y, RHW, U, V, S and T values), but for clarity those further 32-bit data values are not shown in FIG. 4. The primitive block 400 comprises a header 402 which includes state data which is used to interpret the data values included in the primitive block 400. When a primitive block is compressed, an additional header, referred to herein as a "compressed data header", is included with the compressed version of the primitive block which includes information indicating how the primitive block has been compressed.

The 32-bit data values for each of the vertices shown in FIG. 4 are each represented by eight hexadecimal (4-bit) values. In this example, the hexadecimal values are interpreted as data segments of the data of the vertices, such that the data for each vertex shown in FIG. 4 includes eight 4-bit data segments.

In step S304 the data in the primitive block 400 is analysed to determine a compression grouping scheme for grouping the data segments of the different vertices together into segment blocks for compression. In particular, the distribution of the data in the primitive block 400 is analysed in order to determine the presence of patterns within the data in the primitive block 400 which can be used to increase the compression ratio with which the primitive block 400 can be compressed. The distribution of the data within the primitive block 400 affects the performance of the compression of the primitive block 400 that can be achieved. For example, if a column of data segments in the primitive block 400 all have the same value (a "common value") then those data segments can be very efficiently compressed by storing that common value once to represent all of the data segments in a column. Therefore, the analysis in step S304 determines whether there are any columns of data segments which all have the same value as each other. As another example, if the values of the data segments of a column of data segments in the primitive block 400 are within a small range then those data segments may be able to be efficiently compressed by storing an origin value and then representing each of the data segments as a delta value (or "offset") from the origin value. Therefore, the analysis in step S304 may also determine whether there are any columns of data segments which have a small range of values such that they would be suitable for compression using an origin and delta value compression algorithm. As another example, if the data segments of a column of data segments in the primitive block 400 have a small number of different values, e.g. only two or three different values, then those data segments may be able to be efficiently compressed by constructing a look up table of the different values and then representing each of the data segments as an index to reference the look up table. Therefore, the analysis in step S304 may also determine whether there are any columns of data segments which have a small number of different values such that they would be suitable for compression using a look up table compression algorithm.

In step S306 the data segments are grouped together according to the compression grouping scheme that was determined in step S304, to thereby form a plurality of segment blocks. Each of the segment blocks includes a plurality (e.g. sixteen) of segment sets of one or more data segments of a respective plurality (e.g. sixteen) of the vertices, wherein the segment sets have corresponding positions within the data of each of the plurality of the vertices.

FIG. 4 shows eight data segments of sixteen vertices relating to one of the parameters (e.g. the Z value). FIG. 4 shows that the data segments of vertex 1 have the hexadecimal values 8, 2, 4, 9, 4, B, 4 and 0. According to the compression grouping scheme determined in step S304 the data segments of vertex 1 are used to form three segment sets. In particular, the data segments 7, 6 and 0 of vertex 1 form a first segment set 404; the data segments 5 and 4 of vertex 1 form a second segment set 406; and the data segments 3, 2 and 1 of vertex 1 form a third segment set 408. The data segments of the other vertices in the primitive block 400 are used to form segment sets corresponding to those shown in FIG. 4 for vertex 1. The segment sets of the different vertices have corresponding positions within the data in the primitive block 400. Therefore, in the example shown in FIG. 4, for each vertex, the data segments 7, 6 and 0 are used to form a first segment set; the data segments 5 and 4 are used to form a second segment set; and the data segments 3, 2 and 1 are used to form a third segment set.

Segment sets of the different vertices at corresponding positions in the primitive block 400 are grouped together to form segment blocks. In the example shown in FIG. 4, the first segment sets of each of the vertices (including data segments 7, 6 and 0) are grouped together to form a first segment block 412; the second segment sets of each of the vertices (including data segments 5 and 4) are grouped together to form a second segment block 414; and the third segment sets of each of the vertices (including data segments 3, 2 and 1) are grouped together to form a third segment block 416.

In step S308 one or more of the segment blocks are compressed. The segment blocks are compressed separately to each other and may or may not be compressed using the same compression algorithm. Furthermore, one or more of the segment blocks might not be compressed. A suitable compression algorithm is selected to compress a segment block based on the analysis of the data in the primitive block 400 performed in step S304. Once those segment blocks which are going to be compressed have been compressed, then in step S310 the segment blocks are used to form a compressed version of the primitive block 400. As described above, the processing unit 102 sends the compressed version of the primitive block 400 to the parameter buffer 104 for storage therein.

For example, the first segment block 412 comprises segment sets for the vertices which all have the same value, i.e. there is a common value between all of the segment sets within the segment block 412. That is, all of the segment sets in the segment block 412 have hexadecimal data segments with values 8, 2 and 0. In this case the segment block 412 is compressed by representing all of the segment sets in the segment block 412 with the common value (i.e. the common value is stored just once to represent the first segment sets of all of the vertices in the primitive block 400). The common value is stored in the compressed data header of the compressed version of the primitive block 400. The compressed data header also comprises some compression format indication bits which indicate that the first segment block 412 has been compressed using a common value. The compression format indication bits are described in more detail below. The segment block 412 which includes data segments 7, 6 and 0 for all sixteen vertices in the primitive block 400, in an uncompressed form has a total of 192 bits (that is, 12 bits×16 vertices). However, when the segment block 412 is compressed using the common value compression algorithm (as described above) the compressed segment block 412 has, in the compressed data header of the compressed version of the primitive block 400, just twelve bits to represent the common value plus the compression format indication bits to indicate that the segment block 412 is compressed using the common value compression algorithm.

The second segment block 414 comprises segment sets with values which are all within a range of 40 to 56. That is, the lowest value of the segment sets in the second segment block 414 is 40 and the highest value of the segment sets in the second segment block 414 is 56. An origin and delta value compression algorithm is used to compress the second segment block 414. The origin is chosen to be the lowest value of the segment sets of the second segment block 414. That is, the origin is chosen to be a hexadecimal value of 40. Since the lowest value of the segment sets is chosen as the origin (note that in the case in which extended data range is used as described in detail below, the lowest value of the segment sets in the extended range is chosen as the origin), the offset values (or "delta values") will not be negative and therefore there is no need for a sign bit in the offset values. The value of the origin is identified (e.g. in the compressed data header of the compressed version of the primitive block 400) using eight bits. For each of the vertices, a delta value (or "offset") is determined to represent the difference between the origin and the value of the segment set for the particular vertex. The largest value of the delta values in the segment block 414 is a hexadecimal value of 16, which can be represented using five bits. Therefore, the delta values for all of the vertices are represented using five bits. For example, for the segment set 406 of vertex 1, which has a value of 49, the delta value (from the origin of 40) is 9, which is represented in five bits as 01001. Therefore, when the segment block 414 is compressed it is represented by an origin value of 40 (which is represented using eight bits) and sixteen delta values for the respective sixteen vertices (each represented by five bits). The compressed data header of the compressed version of the primitive block 400 comprises compression format indication bits which indicate that the second segment block 414 has been compressed using the origin and delta value compression algorithm. Therefore, the compressed segment block 414 is represented using 88 bits (i.e. 8+16×5) plus the compression format indication bits. This is less than the number of bits (128) used to represent the uncompressed data segments in the segment block 414.

The analysis in step S304 of the distribution of the data in data segments 3, 2 and 1 for the different vertices in the primitive block 400 determined that there is no discernible pattern in the data distribution which can be exploited to compress the data in these data segments in a lossless manner. Therefore, the data segments 3, 2 and 1 are grouped together into the third segment block 416, and the third segment block 416 is not compressed. Therefore, the raw data bits are used to represent the segment sets of the vertices in the third segment block 416. Each segment set (e.g. segment set 408 of vertex 1) in the third segment block 416 comprises three data segments, which is twelve bits. Therefore the raw data of all of the segment sets in the third segment block 416 is represented by 192 bits (that is, 12×16 bits). The compressed data header of the compressed version of the primitive block 400 comprises compression format indication bits which indicate that the third segment block 416 has not been compressed, i.e. the segment sets are represented in the third segment block 416 with raw data values. Therefore, 192 bits (plus the compression format indication bits) are used to represent the third segment block 416.

The compression format indication bits are included in the compressed data header of the compressed version of the primitive block 400 to indicate how the segment blocks in the primitive block 400 are compressed. Any bits that achieve the aim of indicating how the segment blocks in the primitive block 400 are compressed may be used as the compression format indication bits. As described in more detail below, four different compression formats are supported and the compression format indication bits comprise two bits for each segment block to indicate one of the four different compression formats for each of the segment blocks. Furthermore, as described in more detail below, the compressed data header of the compressed version of the primitive block 400 further comprises segment control data which indicates, for each of the data segments, which segment block that data segment is grouped into according to the determined compression grouping scheme.

In the previous compression schemes described in UK Patent Publication Number GB2483502 the 32-bit data values of the vertices relating to a parameter are always divided into four byte-blocks, i.e. four segment blocks each comprising 8-bits of data of each vertex. There are four compression formats which may be used for compressing the byte-blocks, and two bits may be used to indicate one of the four compression formats. Therefore, an eight-bit compression format word is used to indicate the compression format of the four byte-blocks in a 32-bit data value in a primitive block. That is, for each of the four byte-blocks in a 32-bit data value in a primitive block, two bits are used to indicate which of the four compression formats are used to compress the byte block. For example, if the two bits for a byte-block are '00' this indicates that the byte-block has not been compressed and is in raw format; if the two bits for a byte-block are '01' this indicates that the byte-block has been compressed using the common value compression algorithm; if the two bits for a byte-block are '10' this indicates that the byte-block has been compressed using the origin and delta value compression algorithm; and if the two bits for a byte-block are '11' this indicates that the byte-block has been compressed using the look up table compression algorithm. A summary of this is shown in Table 2.

TABLE 2

| Compression format bits | |
| --- | --- |
| Compression Format Bits | Compression algorithm used |
| 00 | No compression, i.e. raw data |
| 01 | Common value compression algorithm |
| 10 | Origin and delta value compression algorithm |
| 11 | Look up table compression algorithm |

Therefore, in the previous compression schemes described in UK Patent Publication Number GB2483502 an eight-bit compression format word is included in the compressed data header of a compressed primitive block to indicate how the four byte-blocks of a 32-bit data value have been compressed.

However, since the compression schemes described herein allow for greater flexibility in how the data segments are grouped into segment blocks for compression, more bits are used in the compressed data header of the compressed version of the primitive block 400 in order to indicate how the data segments are grouped and compressed in the compressed version of the primitive block 400. For example, as an extension to the compression schemes described in UK Patent Publication Number GB2483502, if the maximum number of segment blocks of a 32-bit data value is four and if there are four possible compression algorithms that may be used, then an eight-bit compression format word is included in the compressed data header of the compressed version of the primitive block 400 to thereby indicate respective compression algorithms that are applied to up to four segment blocks. Furthermore, for each of the eight data segment positions in the 32-bit data values two bits are provided in the compressed data header to indicate which of the segment blocks the data segments at the respective positions are to be included in. These two-bit indications for each of the eight data segment positions form a 16-bit data stream control word. In other examples, the 32-bit data values may be divided into more than four segment blocks and/or there may be more than four possible compression algorithms that may be used, such that more than eight bits may be used for the compression format word, and/or more than two bits may be used for each of the indications for the eight data segment positions.

With the data values of the primitive data block 400 shown in FIG. 4, the compression format word has bit values of:

compression format word=00 00 10 01, which indicates (with reference to Table 2 above) that a first of the segment blocks is compressed using the common value compression algorithm, that a second of the segment blocks is compressed using the origin and delta value compression algorithm, and that third and fourth segment blocks are not compressed, i.e. they are output as raw data values. Furthermore, the data stream control word in this example would take values of:

data stream control word=00 00 01 01 10 10 10 00, which indicates that data segments 7, 6 and 0 are included in the first segment block (i.e. segment block 412), data segments 5 and 4 are included in the second segment block (i.e. segment block 414) and data segments 3, 2 and 1 are included in the third segment block (i.e. segment block 416). In this example, data segment 0 is not adjacent to data segments 7 and 6 in the primitive block 400, but all three of these data segments are included in the same segment block (that is, segment block 412). This is allowed when the segment block is compressed using the common value compression algorithm or when the segment block is not compressed (i.e. output in raw format). However, for simplicity of the implementation in hardware it may be preferable in some examples to avoid having non-adjacent data segments in the same segment block when the segment block is compressed using the origin and delta value compression algorithm or the look up table compression algorithm.

Therefore, the compression format word and the data stream control word given above indicate that segment block 412 including data segments 7, 6 and 0 is compressed using the common value compression algorithm; segment block 414 including data segments 5 and 4 is compressed using the origin and delta value compression algorithm; and segment block 416 including data segments 3, 2 and 1 is not compressed. This matches the compression that is applied to the segment blocks 412, 414 and 416 as described above. Therefore, the compression format word and the data stream control word given above are included in the compressed data header of the compressed version of the primitive block 400 to correctly indicate how the data segments are grouped and compressed in the compressed version of the primitive block 400.

Therefore, there are 24 compression format indication bits (an 8-bit compression format word and a 16-bit data stream control word) in the compressed data header 402 of the compressed version of the primitive block 400. Therefore there is a total of 316 bits in the compressed version of the primitive block 400. The 316 bits comprise 12 bits for segment block 412, 88 bits for segment block 414, 192 bits for segment block 416 and 24 compression format indication bits. This compares to 512 bits of data in the uncompressed primitive block 400 (that is, 32 bits×16 vertices).

Furthermore, if the compression schemes described in UK Patent Publication Number GB2483502 are used whereby the 32-bit data values are always divided into four byte-blocks for compression then the following number of bits are used in the compressed primitive block:

Byte 3 (data segments 7 and 6) is compressed using the common value compression algorithm, whereby the common value of 82 is compressed into 8 bits;

Byte 2 (data segments 5 and 4) is compressed in the same way as described above using the origin and delta value compression algorithm, whereby the range of values is compressed into 8 bits for an origin having a value of 40 and 80 bits (16×5 bits) for the sixteen delta values, giving a total of 88 bits for Byte 2;

Byte 1 (data segments 3 and 2) cannot be compressed the using origin and delta compression algorithm or the look up table compression algorithm, so the raw data values are used having a total of 128 bits (16×8 bits) for Byte 1; and Byte 0 (data segments 1 and 0) cannot be compressed the using origin and delta compression algorithm or the look up table compression algorithm, so the raw data values are used having a total of 128 bits (16×8 bits) for Byte 0.

Furthermore, as described above, 8 bits will be used in the compression data header as the compression format word. Therefore, a total of 360 bits are used to represent the compressed primitive block using the compression schemes described in UK Patent Publication Number GB2483502. This is more than the 316 bits which are used to represent the compressed version of the primitive block 400 using the compression schemes described herein in which the grouping of the data segments into segment blocks can be varied according to the results of the analysis of the distribution of the data in the primitive block 400 performed in step S304.

It can therefore be seen that by analysing the data in the data block to determine a suitable compression grouping scheme, the data segments can be grouped together into segment blocks for compression in such a way that allows for greater compression of the data in the primitive block 400. The compression of the data may be optimized by grouping the data segments into segment blocks accordingly.

Compared to the compression schemes described in UK Patent Publication Number GB2483502 in which the 32-bit data values are always divided into four byte-blocks for compression, the compression schemes described herein (in which the grouping of the data segments into segment blocks can be varied according to the results of an analysis of the distribution of the data in the primitive block 400) include some extra processing steps to be carried out in the processing unit 102 in order to carry out the analysis in step S304 and to generate the extra data stream control words that are needed in the compressed data header of the compressed version of the primitive block 400. However, these extra processing steps normally involve relatively simple computations to be performed, such that any disadvantage associated with needing to carry out the extra processing steps is normally outweighed by the benefits achieved in reducing the number of bits used to represent the compressed version of the primitive block 400. As described above, reducing the amount of data used to represent the compressed version of the primitive block 400 is an important factor in improving the performance of the system 100 because this reduces the amount of compressed vertex parameter data which is passed between the processing unit 102 and the parameter buffer 104, and it also reduces the space that is needed in the parameter buffer 104 in order to store the compressed vertex parameter data.

The analysis performed in step S304 follows a set of rules for determining how to group the data segments together into segment blocks for compression. As an example, the rules for grouping the data segments into segment blocks may be:

1. Identify all columns of data segments in the primitive block 400 in which the data segments in the column all have a common value. These columns of data segments are grouped together into segment blocks and can be compressed using the common value compression algorithm described above (e.g. by including the common value in the header). For example, data segments 7 and 6 and data segment 0 shown in FIG. 4 are grouped together into segment block 412 and are compressed using the common value compression algorithm.

2. For the remaining columns of data segments (i.e. those which are not identified in rule 1 above), identify any combination of columns of data segments (e.g. two or more adjacent columns of data segments) which can be compressed using the origin and delta value compression algorithm or using the look up table compression algorithm. For example, if the data segments of any combination of columns have a range of data values that is limited then those columns may be suitable for compression using the origin and delta value compression algorithm. For example, the columns of data segments 5 and 4 in FIG. 4 all have values within a range from 40 to 56, so these data segments are grouped together into segment block 414 which is then compressed using the origin and delta value compression algorithm. Similarly, if the data segments of any combination of columns have a limited number of different values then those columns may be suitable for compression using the look up table compression algorithm.

3. For the remaining columns of data segments (i.e. those which are not identified in rules 1 or 2 above), identify any single columns of data segments (i.e. 4-bit streams) which can be compressed using the origin and delta value compression algorithm or using the look up table compression algorithm. For example, if the data segments of any 4-bit columns have a range of data values that is limited then those columns may be suitable for compression using the origin and delta value compression algorithm. Similarly, if the data segments of any 4-bit columns have a limited number of different values then those columns may be suitable for compression using the look up table compression algorithm. For example, the column of data segments 0 for the vertices in the primitive block 600 shown in FIG. 6 all have a value of 0, 4 or C, so these data segments are grouped together into segment block 620 which is then compressed using the look up table compression algorithm as described in more detail below.

4. For the remaining columns of data segments (i.e. those which are not identified in rules 1, 2 or 3 above), the columns of data segments are not compressed. In other words, the remaining columns of data segments are included as raw data values in the compressed primitive block.

As well as the four rules given above, further conditions can be set e.g. to constrain the number of segment blocks and/or the number of bits in the segment blocks for compression (e.g. as described above in relation to an 8-bit compression format word), to thereby simplify the hardware implementation. The compression grouping scheme determined based on the analysis in step S304 may be determined within a constraint of an upper limit to the number of segment blocks into which the data segments in the data block are grouped. For example, the upper limit to the number of segment blocks into which the data segments in the data block are grouped may be four, as in the example described above. Furthermore, the compression grouping scheme determined based on the analysis in step S304 may be determined within a constraint of an upper limit to the number of bits in a segment set. For example, the upper limit to the number of bits in a segment set may be sixteen.

In other examples, other rules to those given above may be used in the analysis performed in step S304.

FIG. 5 shows another example in which 32-bit data values of sixteen different vertices relating to one of the parameters (e.g. the RHW value) are included in a primitive block 500. The primitive block 500 includes further 32-bit data values of the sixteen different vertices relating to other ones of the parameters (e.g. the X&Y, Z, U, V, S and T values), but for clarity those further 32-bit data values are not shown in FIG. 5. It is noted that it is possible to combine common values across a plurality of parameters e.g. if the top bits of two or more parameters contain the same values for all of the vertices in a primitive block. The primitive block 500 comprises a header 502 which includes state data (similar to that included in header 402 described above with reference to FIG. 4) which is used to interpret the data values included in the primitive block 500. The format of the data in the primitive block 500 is the same as the format of the data in the primitive block 400 described above in relation to FIG. 4. Therefore, the 32-bit data values for each of the vertices shown in FIG. 5 are each represented by eight hexadecimal (4-bit) values. In this example, the hexadecimal values are interpreted as data segments of the data of the vertices, such that the data for each vertex shown in FIG. 5 includes eight 4-bit data segments.

According to the compression schemes described herein, the data in the primitive block 500 is analysed and based on that analysis a compression grouping scheme is determined. According to the compression grouping scheme, the data segments 7, 6 and 5 of the vertices in the primitive block 500 (e.g. segment set 504 of vertex 1 and corresponding segment sets of the other vertices) are grouped together into a segment block 510 as shown in FIG. 5. The data segments are grouped into the segment block 510 in this way, based on the analysis of the data in the primitive block 500, because the data segments 7, 6 and 5 for all of the vertices in the primitive block 500 have a common value. The common value is 7DB as shown in FIG. 5. By grouping the data segments 7, 6 and 5 together into segment block 510 for compression the common value compression algorithm can be used to compress the segment block 510. Therefore, the data in the segment block 510 can be compressed into twelve bits. Those twelve bits are the bits needed to represent the common value of 7DB and are stored in the compressed data header of the compressed version of the primitive block 500.

According to the compression grouping scheme, the data segments 4 and 3 of the vertices in the primitive block 500 (e.g. segment set 506 of vertex 1 and corresponding segment sets of the other vertices) are grouped together into a segment block 512 as shown in FIG. 5. The data segments are grouped into the segment block 512 in this way, based on the analysis of the data in the primitive block 500, although the range of the values of the segment sets including data segments 4 and 3 for all of the vertices in the primitive block 500 is from 00 to FF, the extended data range is limited to be in the range from FE to 101. The use of an extended data range is described in more detail below. By grouping the data segments 4 and 3 together into segment block 512 for compression the origin and delta value compression algorithm can be used to compress the segment block 512. In the example shown in FIG. 5, the delta values are in the range from 0 to 3 and can be represented using 2 bits. In this way, the data in the segment block 512 can be compressed into forty bits. Those forty bits include eight bits, stored in the compressed data header of the compressed version of the primitive block 500, to represent the origin value of FE and two bits for each of the sixteen vertices to represent a delta value for the segment set of that vertex.

According to the compression grouping scheme, the data segments 2, 1 and 0 of the vertices in the primitive block 500 (e.g. segment set 508 of vertex 1 and corresponding segment sets of the other vertices) are grouped together into a segment block 514 as shown in FIG. 5. The data segments are grouped into the segment block 514 in this way, based on the analysis of the data in the primitive block 500, because the distribution of the data for the vertices in data segments 2, 1 and 0 is quite widespread. As such, none of the lossless compression schemes described above can be used to reduce the amount of data needed to represent the data segments 2, 1 or 0. Therefore, segment block 514 is not compressed and instead the raw data bits are included in the compressed primitive block 500. Therefore, segment block 514 includes 192 bits, which is twelve bits for each of the sixteen vertices.

As described above, the compressed data header of the compressed version of the primitive block 500 will include 24 bits of state control data to indicate the compression format of the data segments in the primitive block 500. In particular, the state control data will include an 8-bit compression format word and a 16-bit data stream control word, similar to those included in the compressed data header of the compressed primitive block 400 as described above in relation to FIG. 4.

Therefore, the total number of bits in the compressed version of the primitive block 500 will be 268 (that is, 12+40+192+24 bits). This compares to 512 bits in the uncompressed primitive block 500. Furthermore, as described in more detail below, if the compression schemes described in UK Patent Publication Number GB2483502 in which the 32-bit data values are always divided into four byte-blocks for compression are used to compress the primitive block 500 then the compressed primitive block would be represented with 304 bits (i.e. more bits than if the compression schemes described herein are used to compress the primitive block 500).

For example, if the compression schemes described in UK Patent Publication Number GB2483502 are used whereby the 32-bit data values are always divided into four byte-blocks for compression then the 304 bits used to represent the compressed primitive block 500 are broken down as follows:

Byte 3 (data segments 7 and 6) is compressed using the common value compression algorithm, whereby the common value of 7D is compressed into 8 bits;

Byte 2 (data segments 5 and 4) is compressed using the look up table compression algorithm, whereby sixteen bits are stored in the compressed data header to represent the two values B0 and BF in the look up table, and 16 bits are used for the sixteen index values to reference the look up table, thereby giving a total of 32 bits for Byte 2;

Byte 1 (data segments 3 and 2) cannot be compressed the using origin and delta compression algorithm or the look up table compression algorithm, so the raw data values are used having a total of 128 bits (16×8 bits) for Byte 1; and Byte 0 (data segments 1 and 0) cannot be compressed the using origin and delta compression algorithm or the look up table compression algorithm, so the raw data values are used having a total of 128 bits (16×8 bits) for Byte 0.

Furthermore, as described above, 8 bits will be used in the compressed data header of the compressed version of the primitive block 500 as the compression format word, thereby giving the total of 304 bits (i.e. 8+32+128+128+8 bits).

FIG. 6 shows a further example in which 32-bit data values of sixteen different vertices relating to one of the parameters (e.g. the RHW value) are included in a primitive block 600. The primitive block 600 includes further 32-bit data values of the sixteen different vertices relating to other ones of the parameters (e.g. the X&Y, Z, U, V, S and T values), but for clarity those further 32-bit data values are not shown in FIG. 6. The primitive block 600 comprises a header 602 which includes state data (similar to that included in header 402 described above with reference to FIG. 4) which is used to interpret the data values included in the primitive block 600. The format of the data in the primitive block 600 is the same as the format of the data in the primitive block 400 described above in relation to FIG. 4. Therefore, the 32-bit data values for each of the vertices shown in FIG. 6 are each represented by eight hexadecimal (4-bit) values. In this example, the hexadecimal values are interpreted as data segments of the data of the vertices, such that the data for each vertex shown in FIG. 6 includes eight 4-bit data segments.

According to the compression schemes described herein, the data in the primitive block 600 is analysed and based on that analysis a compression grouping scheme is determined. According to the compression grouping scheme, the data segments 7 and 6 of the vertices in the primitive block 600 (e.g. segment set 604 of vertex 1 and corresponding segment sets of the other vertices) are grouped together into a segment block 612 as shown in FIG. 6. The data segments are grouped into the segment block 612 in this way, based on the analysis of the data in the primitive block 600, because the data segments 7 and 6 for all of the vertices in the primitive block 600 have a common value. The common value is 7E as shown in FIG. 6. By grouping the data segments 7 and 6 together into segment block 612 for compression the common value compression algorithm can be used to compress the segment block 612. Therefore, the data in the segment block 612 can be compressed into eight bits. Those eight bits are the bits used to represent the common value of 7E and are stored in the compressed data header of the compressed version of the primitive block 600.

According to the compression grouping scheme, the data segment 1 of the vertices in the primitive block 600 (e.g.

segment set 608 of vertex 1 and corresponding segment sets of the other vertices) are also formed into corresponding segment sets. These segment sets of the vertices are then grouped together into a segment block 616 as shown in FIG. 6. The data segments are grouped into the segment block 616 in this way, based on the analysis of the data in the primitive block 600, because there are only four different values for the data segments in the segment block 616. By grouping the data segments at position 1 for the vertices in the primitive block 600 together into segment block 616 for compression the look up table compression algorithm can be used to compress the segment block 616. It is noted that in order to provide flexibility to the number if values included in a look up table some extra control bits may be included. In the example described here, three extra control bits are included which allow up to eight entries in a look up table. In this way, the data in the segment block 616 can be compressed into 51 bits. Those 51 bits include sixteen bits, stored in the compressed data header of the compressed version of the primitive block 600, to represent the four different values of 0, 7, 8 and 9 in a look up table, three bits to indicate that there are four values in the look up table, and two bits for each of the sixteen vertices to represent an index to reference the look up table.

Similarly, according to the compression grouping scheme, the data segment 0 of the vertices in the primitive block 600 (e.g. segment set 610 of vertex 1 and corresponding segment sets of the other vertices) are grouped together into a segment block 618 as shown in FIG. 6. The data segments are grouped into the segment block 618 in this way, based on the analysis of the data in the primitive block 600, because there are only three different values for the data segments in the segment block 618. By grouping the data segments at position 0 for the vertices in the primitive block 600 together into segment block 618 for compression the look up table compression algorithm can be used to compress the segment block 618. In this way, the data in the segment block 618 can be compressed into 47 bits. Those 47 bits include twelve bits, stored in the compressed data header of the compressed version of the primitive block 600, to represent the three different values of 0, 4 and C in a look up table, three bits to indicate that there are three values in the look up table and two bits for each of the sixteen vertices to represent an index to reference the look up table.

According to the compression grouping scheme, the data segments 5, 4, 3 and 2 of the vertices in the primitive block 600 (e.g. segment set 606 of vertex 1 and corresponding segment sets of the other vertices) are grouped together into a segment block 614 as shown in FIG. 6. The data segments are grouped into the segment block 614 in this way, based on the analysis of the data in the primitive block 600, because the distribution of the data for the vertices in data segments 5, 4, 3 and 2 is quite widespread. As such, none of the lossless compression schemes described above can be used to reduce the amount of data needed to represent the data segments 5, 4, 3 and 2. Therefore, segment block 614 is not compressed and instead the raw data bits are included in the compressed primitive block 600. Therefore, segment block 614 includes 256 bits, which is sixteen bits for each of the sixteen vertices.

As described above, the compressed data header of the compressed version of the primitive block 600 will include 24 bits of state control data to indicate the compression format of the data segments in the primitive block 600. In particular, the state control data will include an 8-bit compression format word and a 16-bit data stream control word, similar to those included in the compressed data header of the compressed version of the primitive block 400 as described above in relation to FIG. 4.

Therefore, the total number of bits in the compressed primitive block 600 will be 386 (that is, 8+256+51+47+24 bits). This compares to 512 bits in the uncompressed primitive block 600. Furthermore, as described in more detail below, if the compression schemes described in UK Patent Publication Number GB2483502 in which the 32-bit data values are always divided into four byte-blocks for compression are used to compress the primitive block 600 then the compressed primitive block would be represented with 400 bits (i.e. more bits than if the compression schemes described herein are used to compress the primitive block 600).

For example, if the compression schemes described in UK Patent Publication Number GB2483502 are used whereby the 32-bit data values are always divided into four byte-blocks for compression then the 400 bits used to represent the compressed primitive block 600 are broken down as follows:

Byte 3 (data segments 7 and 6) is compressed using the common value compression algorithm, whereby the common value of 7E is compressed into 8 bits;

Byte 2 (data segments 5 and 4) cannot be compressed the using origin and delta compression algorithm or the look up table compression algorithm, so the raw data values are used having a total of 128 bits (16×8 bits) for Byte 2;

Byte 1 (data segments 3 and 2) cannot be compressed the using origin and delta compression algorithm or the look up table compression algorithm, so the raw data values are used having a total of 128 bits (16×8 bits) for Byte 1; and Byte 0 (data segments 1 and 0) cannot be compressed the using origin and delta compression algorithm or the look up table compression algorithm, so the raw data values are used having a total of 128 bits (16×8 bits) for Byte 0.

Furthermore, as described above, 8 bits will be used in the compressed data header as the compression format word, thereby giving the total of 400 bits (i.e. 8+128+128+128+8 bits).

The origin and delta value compression algorithm may be adapted to include an extended data range (e.g. as used to compress segment block 512 of primitive block 500 as described above). An extended data range can be used to reduce the number of bits used for delta values to represent the original data from an origin value. For example, there may be a segment block which comprises the data values 00, 01, 02, FB, FC and FE (and only those data values). According to a non-extended origin and delta value compression algorithm, the origin would be 00 (i.e. the lowest value) and the data range would be FE−00=FE, which is represented with 8 bits. Therefore the delta values would each have eights bits, representing an offset from the origin 00, so there would be no reduction in data by using a non-extended origin and delta compression algorithm in this way.

Figure 7:
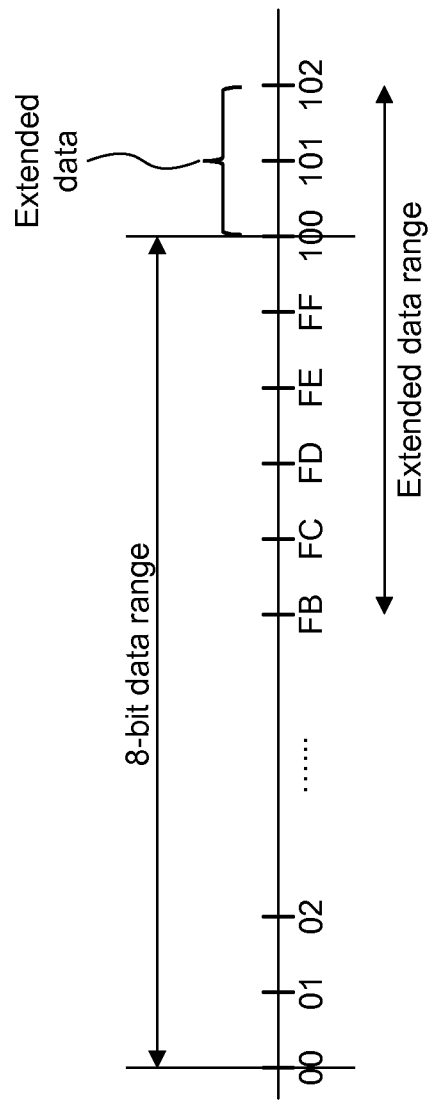
FIG. 7 is an example of an extended data range encoding.

However, as shown in FIG. 7 a bias value may be added to one or more (but not all) of the segment sets to thereby reduce the range of the values of the segment sets in the segment block. The bias value is one greater than the maximum value in the segment block data range (e.g. the bias value may be 100 in hexadecimal for an 8-bit data segment such as that shown in FIG. 7), and can be added to some of the original data values. For example, the data values 00, 01, 02, FB, FC and FE are shown on a scale in FIG. 7 and are shown to be within the 8-bit data range which can be represented with the two hexadecimal values in the segment sets. However, the data values 00, 01 and 02 can be extended outside the 8-bit range by adding a bias value. In the example shown in FIG. 7 for 8-bit data, the bias value is 100 in hexadecimal or 256 in decimal, such that the extended data values are 100, 101 and 102. The data values can then be represented in extended data range as (FB, FC, FE, 100, 101, 102) as shown in FIG. 7, and the data range of the extended data range is 102−FB=7, such that only 3 bits are used for each of the delta values from an origin value FB. Therefore the data can be compressed with the origin and delta value compression algorithm by using the extended data range. This may be achieved without actually performing an addition of the bias value to any of the data values, but instead by recognizing that the values of 00, 01 and 02 may be interpreted the same as values of 100, 101 and 102 respectively in a modulo-256 system such as that described here.

For each of the data values in the segment block it can be determined whether it would be beneficial to add the bias value (e.g. 100 in hexadecimal for 8-bit values) to the data value. Then, the minimum of the resulting data values is chosen as the origin.

The extended data range uses the fact that the hardware considers a particular number of bits for the segment blocks. For example, the segment blocks including segment sets which have two hexadecimal values (i.e. 8 bits) can include values in the range from 00 to FF. A hexadecimal value of 100 is interpreted the same as a hexadecimal value of 00 because the segment block is limited to including 8-bit values. In the example described above the value of FB is used as the origin because it is the lowest value in the extended data range (as shown in FIG. 7). The delta values are such that the value FB is represented with a delta value 00, the value FC is represented with a delta value 01, the value FE is represented with a delta value 03. For the original data 00, because it is less than the origin value FB, a bias value 100 is added before the delta value is calculated, such that the delta value is calculated to be 100−FB=05. Similarly, the delta values for 01 and 02 are 06 and 07 respectively.

The compressed values which have been compressed using the extended data range as described above can be decompressed in the same way as for the origin and delta value compression algorithm which does not use the extended data range. Using the example given above, when it comes to decompressing a compressed value for which the delta value is 05 and the origin is FB, the delta value (05) is added to the origin value (FB) to give a hexadecimal value of 100. Since the segment blocks in this example only include two hexadecimal values (i.e. eight bits), the hexadecimal value 100 is interpreted as 00 to thereby provide the correct decompressed value. Similarly, the value of 02 is compressed to give a delta value of 07 which when added to the origin (FB) during decompression gives a hexadecimal value of 102, which will be correctly interpreted as 02.

It can be seen in the examples described above that the segment sets are of a variable size. In other words the number of data segments of each vertex which are included in the segment blocks is not fixed. Some segment blocks (e.g. segment blocks 412 and 414) include two data segments (i.e. 8 bits) of the data from each vertex. These segment blocks may be byte blocks. However, other segment blocks may be different sizes and may for example include one, three or more data segments of the data from each vertex. The sizes of the segment blocks are determined based on the analysis of the distribution of the data in the primitive block to thereby optimize the compression of the segment blocks of the primitive block. Furthermore, the number of segment sets into which the 32-bits of data of each vertex in the primitive block is grouped is variable, e.g. based on the analysis of the distribution of the data in the primitive block to thereby optimize the compression of the segment blocks. For example, the data segments in the primitive block 400 shown in FIG. 4 are grouped into four segment blocks, the data segments in the primitive block 500 shown in FIG. 5 are grouped into three segment blocks, and the data segments in the primitive block 600 shown in FIG. 6 are grouped into four segment blocks.

Furthermore, in the examples described above, the data segments of the data in the primitive block have four bits, such that each data segment corresponds to one hexadecimal value. However, more generally, the data segments may have any number of bits. For example, the data segments could all have two bits, or they could all have one bit. In the examples shown in FIGS. 4 to 6, the data segments all have the same number of bits as each other. However, in some other examples, the data segments may not all have the same number of bits in the primitive block, e.g. some data segments may have three bits and others may have five bits. Having fewer bits in each data segment and having a variable number of bits in each data segment allows more flexibility in how the bits of data in the primitive block are grouped together into segment blocks. This may allow for greater compression of the data in the primitive block. However, as the flexibility in the way the data in the primitive block is grouped into segment blocks increases, the number of control state words needed in the compressed data header of the compressed version of the primitive block to indicate how the data has been compressed will also increase. There is therefore a trade-off to consider when deciding how much flexibility to allow in the compression grouping scheme.

In the examples given above, four compression formats are supported: (i) the common value compression algorithm, (ii) the origin and delta value compression algorithm, (iii) the look up table compression algorithm, and (iv) no compression, i.e. raw data values. However, in other examples, other compression algorithms may be used, such as those described in UK Patent Publication Number GB2483502. For example, a compression algorithm with multiple origin values and delta values for each of the vertices being an offset from one of the origins. In this compression algorithm, separate origins are identified based on the values of a plurality of segment sets in a segment block. For each of the segment sets in the segment block, a minimum difference value from one of the origins and an index to the origin which is being used are determined. Another compression format combines features of the origin and delta compression algorithm with the look up table algorithm, such that an origin and a set of difference values are determined, the difference values are stored in a look up table, and an index value is stored to identify the appropriate difference value for each of the segment sets in a segment block. Further compression formats may be devised with other combinations of features. For example, multiple origin values may be combined with one or more look up tables of difference values. If more than four compression formats are supported then more than two compression format bits are needed for each segment block in the compressed data header of a compressed version of the primitive block to indicate the compression format of that segment block. For example, if there are between five and eight possible compression formats available then three compression format bits are included in the compressed data header for each segment block of a compressed primitive block to indicate the compression format of that segment block.

As described above, a primitive block may include, for example, data of 64 vertices. In other examples, a primitive block may include data of more vertices, e.g. 256 vertices. The data in a primitive block may be split up into sections, whereby each section comprises the data of a respective subset (e.g. 64) of the vertices. In this case, the data segments of the vertices in each section are grouped into segment blocks separately such that each segment block includes data segments of vertices within just one of the sections. By splitting up the primitive block into smaller sections, it is more likely that the compression algorithms described above, such as the common value algorithm, can be used to compress the data in at least some of the sections. Furthermore, the vertex data in the primitive block may be re-ordered based on the analysis of the distribution of the data in the primitive block to thereby increase the similarity of the data of different vertices included in at least one of the sections. For example all of the vertices with the same values for the most significant byte (MSB) may be grouped into a section so that the common value compression algorithm can be used to compress the MSBs of those vertices. If the data of the vertices in the primitive block is reordered then a re-indexing process will also need to be performed to keep track of where in the primitive block the data of each of the vertices can be found. The re-indexing process could be implemented with a look up table to indicate how each vertex has been re-indexed in the primitive block.

There is described herein a lossless compression scheme for compressing the data of a primitive block whereby the data segments are grouped together into segment blocks for compression based on an analysis of the data in the primitive block. The data of each vertex can be addressed separately in the compressed primitive block, thereby allowing for random access of compressed vertex data from the compressed primitive block. This is particularly useful for a tile-based computer graphics system which may access the data of some (but not necessarily all) of the vertices in a primitive block for use in processing a particular tile, and part of the vertex data in a primitive block may be accessed multiple times in processing the primitives in the tiles.

Figure 8:
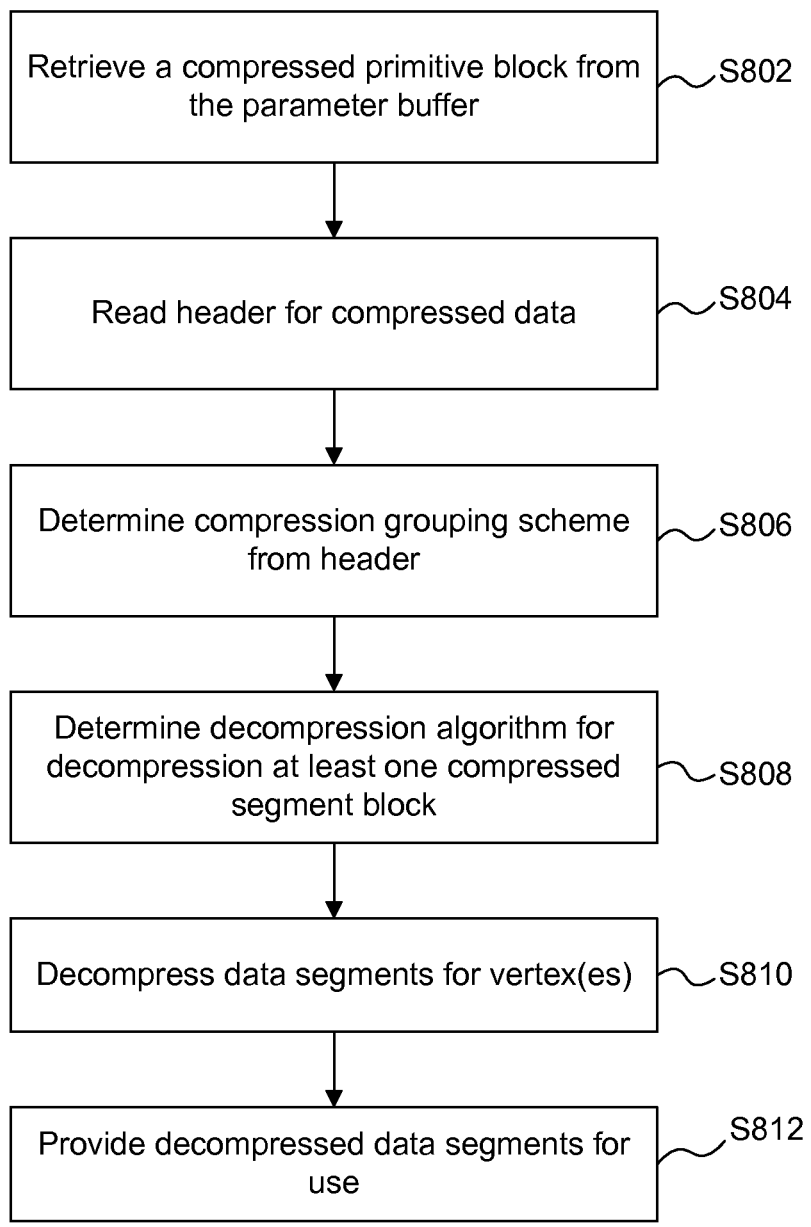
FIG. 8 is an example of a process of decoding a compressed primitive block.

An example method of decompression is depicted in FIG. 8. As described above, when the processing unit 102 retrieves a compressed primitive block from the parameter buffer 104, it decompresses the data relating to one or more of the vertices from the compressed primitive block. Concerning the example of FIG. 8, in order to retrieve data of a selected vertex, the compressed primitive block which includes the data of the selected vertex is retrieved (S802) by the processing unit 102 from the parameter buffer 104. Processing unit 102 reads (S804) a header (e.g. the compressed data header) of the compressed data block to determine (S806) the compression grouping scheme used to group the data segments of the selected vertex into segment blocks for compression (e.g. indicated by the data stream control word in the header) and to determine (S808) a decompression algorithm for decompressing at least one compressed segment block of the compressed data block (e.g. indicated by the compression format word in the header). The data segments of the selected vertex in the at least one compressed segment block of the compressed data block are decompressed (S810) using the determined decompression algorithm, to thereby provide (S812) the decompressed vertex parameter data of the selected vertex.

A means for analysing data in a data block to determine a compression grouping scheme includes a processor to analyse data in data blocks according to the analysis methods of the disclosure, and circuitry arranged to analyse data in data blocks according to the disclosure. A means for grouping together data segments of the vertices includes a processor programmed to implement any of the disclosed compression grouping schemes, and also circuitry arranged to implement any of the disclosed compression grouping schemes herein. A means for forming a compressed data block includes a processor configured to compress segment blocks that are grouped according to a grouping scheme, and also circuitry arranged for compressing segments blocks that are grouped according to a grouping scheme. A means for decompression includes a processor configured to perform decompression of compressed grouped segment blocks that were grouped according to a disclosed grouping method, and circuitry arranged to decompress at least one compressed segment block, which implements a compression grouping scheme according to the disclosure.

An IEEE floating point value which has 32 bits, such as those shown for the vertices in FIGS. 4 to 6, has 8 bits for the exponent and 23 bits for the mantissa plus 1 bit for the sign. As described in UK Patent Publication Number GB2483502, the sign bit occupies the most significant bit. Therefore the value of data segment 7 of a vertex will jump by a large amount between two floating point values with the same exponent but different signs. From the analysis of the data distribution the most significant data segment (segment 7) is likely to be the most easily compressed. Data distribution features of the exponent values should be preserved from disturbance caused by changes to the sign bit. Therefore, the sign bit may be moved before the data is compressed. For example, the sign bit of a 32 bit floating point value may be moved from bit 31 to bit 0 before compression of vertex parameter data. The data distribution of the least significant data segment is often widespread and it is not expected to have good compression results, therefore moving the sign bit to the bottom of the least significant data segment (segment 0) might not significantly affect the overall compression ratio. In general, the sign bit can be moved to be anywhere within the 32-bit data of the vertex, based on the analysis of the data. For example, the sign bit can be moved to a position which is determined, based on the analysis, to result in the best overall compression of the data in the primitive block.

After the compressed primitive block has been decompressed the sign bit is moved back to bit 31 to reconstruct the original 32 bit floating point value.

Generally, any of the functions, methods, techniques or components described above (e.g. the steps shown in FIG. 3) can be implemented in modules (e.g. within the processing unit 102) using software, firmware, hardware (e.g., fixed logic circuitry), or any combination of these implementations. The terms "module," "functionality," "component", "unit" and "logic" are used herein to generally represent software, firmware, hardware, or any combination thereof.

In the case of a software implementation, the module, functionality, component or logic represents program code that performs specified tasks when executed on a processor (e.g. one or more CPUs). In one example, the methods described may be performed by a computer configured with software in machine readable form stored on a computer-readable medium. One such configuration of a computer-readable medium is signal bearing medium and thus is configured to transmit the instructions (e.g. as a carrier wave) to the computing device, such as via a network. The computer-readable medium may also be configured as a computer-readable storage medium and thus is not a signal bearing medium, but rather a non-transitory medium. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The software may be in the form of a computer program comprising computer program code for configuring a computer to perform the constituent portions of described methods or in the form of a computer program comprising computer program code means adapted to perform all the steps of any of the methods described herein when the program is run on a computer and where the computer program may be embodied on a computer readable medium. The program code can be stored in one or more computer readable media. The features of the techniques described herein are platform-independent, meaning that the techniques may be implemented on a variety of computing platforms having a variety of processors.

When a processor is configured by program code to perform actions attributed to a particular module herein; for example, an analysis module, a grouping module, a compression module, a reading module, a decompression module, the processor embodies that module. Such processor may be capable of being configured by program code to implement multiple of such modules at the same time, and thus may effectively embody all of those multiple modules simultaneously. A processor can be implemented with circuitry, including interconnected logic elements that form, for example, combinatorial logic, registers, buffers, memories, and so on. Some of this circuitry may be for decoding instructions, to determine operations to be performed, source operands in those operations, and so on. Other circuitry may be provided for interacting with memories, for performing arithmetic operations, logic operations, floating point math operations, and so on. When a processor is configured to execute an instruction for implementing a particular module, different of these circuits may be configured to perform constituent operations for executing the instruction, at potentially different times.

From the disclosure, those skilled in the art will also realize that all, or a portion of the functionality, techniques or methods may be carried out by dedicated circuitry, an application-specific integrated circuit, a programmable logic array, a field-programmable gate array, or the like. For example, the module, functionality, component or logic may comprise hardware in the form of circuitry. Such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnects, by way of example. Such elements may be provided as custom circuits or standard cell libraries, macros, or at other levels of abstraction. Such elements may be interconnected in a specific arrangement. The module, functionality, component or logic may include circuitry that is fixed function and circuitry that can be programmed or configured to perform a function or functions; such programming may be provided from a firmware or software update or control mechanism. In an example, hardware logic has circuitry that implements a fixed function operation, state machine or process.

Aspects of the disclosure also encompass software which "describes" or defines the configuration of hardware that implements a module, functionality, component or logic described above, such as HDL (hardware description language) software, as is used for designing integrated circuits, or for configuring programmable chips, to carry out desired functions. That is, there may be provided a computer readable storage medium having encoded thereon computer readable program code for use in generating a processing unit configured to perform any of the methods described herein, or for use in generating a processing unit comprising any apparatus described herein.

The term 'processor' and 'computer' are used herein to refer to any device, or portion thereof, with processing capability such that it can execute instructions, or a dedicated circuit capable of carrying out all or a portion of the functionality or methods, or any combination thereof.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It will be understood that the benefits and advantages described above may relate to one example or may relate to several examples.

Any range or value given herein may be extended or altered without losing the effect sought, as will be apparent to the skilled person. The steps of the methods described herein may be carried out in any suitable order, or simultaneously where appropriate. Aspects of any of the examples described above may be combined with aspects of any of the other examples described to form further examples without losing the effect sought.

The invention claimed is:

1. A method of compressing vertex parameter data in a computer graphics system, wherein the vertex parameter data comprises a data block comprising data of vertices relating to at least one parameter, the data of each of the vertices includes a plurality of data segments at respective positions, the method comprising:
    analysing the data in the data block to determine a compression grouping scheme for grouping data segments of the vertices into segment blocks for compression;
    grouping together data segments of the vertices according to the determined compression grouping scheme to form a plurality of segment blocks, the compression grouping scheme being determined such that each of the segment blocks includes a plurality of segment sets of one or more data segments of a respective plurality of the vertices, the segment sets having corresponding positions within the data of each of the plurality of the vertices;
    compressing at least one of the segment blocks; and
    subsequent to said compressing at least one of the segment blocks, using the segment blocks to form a compressed data block.

2. The method of claim 1 wherein said compressing at least one of the segment blocks comprises selecting a compression algorithm based on said analysis of the data in the data block.

3. The method of claim 1 wherein said compressing at least one of the segment blocks comprises compressing a first of the segment blocks using a first compression algorithm and compressing a second of the segment blocks using a second compression algorithm.

4. The method of claim 1 wherein a number of data segments of each vertex included in a first of the segment blocks is different to a number of data segments of each vertex included in a second of the segment blocks.

5. The method of claim 1 wherein if the segment sets of the plurality of vertices included in a segment block have a common value, then the segment block is compressed by representing all of the segment sets in the segment block with said common value.

6. The method of claim 1 wherein said compressing at least one of the segment blocks comprises:
identifying an origin based on the value of at least one segment set in a segment block, and
determining, for each of the segment sets in the segment block, a difference value from an origin.

7. The method of claim 6 wherein the value of the segment set with the lowest value in the segment block is chosen as an origin, or wherein a bias value is added to one or more the segment sets in the segment block to thereby reduce the range of the values of the segment sets in the segment blocks.

8. The method of claim 6 wherein said compressing at least one of the segment blocks comprises:
identifying separate origins based on the values of a plurality of segment sets in a segment block, and
determining, for each of the segment sets in the segment block, a minimum difference value from one of the origins, and an index to the origin which is used.

9. The method of claim 6 wherein said compressing at least one of the segment blocks comprises:
constructing a look up table for the difference values of the segment sets in the segment block, and
determining, for each of the segment sets in the segment block, an index to reference the look up table.

10. The method of claim 1 wherein said compressing at least one of the segment blocks comprises:
constructing a look up table for the different values of the segment sets in a segment block of the plurality of segment blocks, and
determining, for each of the segment sets in that segment block, an index to reference the look up table.

11. The method of claim 1 further comprising forming a header of the compressed data block, wherein the header includes compression format data which indicates the compression format of the segment blocks within the compressed data block, or wherein the header of the compressed data block further comprises segment control data which indicates, for each of the other data segments, which segment block that data segment is grouped into according to the determined compression grouping scheme.

12. The method of claim 1 wherein the compression grouping scheme is determined: (i) within a constraint of an upper limit to the number of segment blocks into which the data segments in the data block are grouped, or (ii) within a constraint of an upper limit to the number of bits in a segment set.

13. The method of claim 1 wherein, based on said analysis of the data in the data block, the compression grouping scheme is determined such that segment sets of the plurality of vertices which have corresponding positions within the data of each of the plurality of the vertices and which all have the same value are grouped together into a segment block.

14. The method of claim 1 further comprising splitting the data block up into sections, whereby each section comprises the data of a respective subset of the vertices, wherein the data segments of the vertices in each section are grouped into segment blocks separately such that each segment block includes data segments of vertices within just one of the sections.

15. The method of claim 14 further comprising re-ordering the data of the vertices within the data block based on said analysis of the data in the data block to thereby increase the similarity of the data of different vertices included in at least one of the sections.

16. A data decompression unit in a computer graphics system, the data decompression unit being configured to decompress compressed vertex parameter data which has been compressed using the method of claim 1 to provide decompressed vertex parameter data of a selected vertex, the data decompression unit comprising:
a reading module configured to read a header of the compressed data block to determine the compression grouping scheme used to group the data segments of the selected vertex into segment blocks for compression and to determine a decompression algorithm for decompressing at least one compressed segment block of the compressed data block; and
a decompression module configured to decompress the data segments of the selected vertex in the at least one compressed segment block of the compressed data block using the determined decompression algorithm, to thereby provide the decompressed vertex parameter data of the selected vertex.

17. A computer graphics system comprising a processing unit configured to compress vertex parameter data, wherein the vertex parameter data comprises a data block comprising data of vertices relating to at least one parameter, wherein the data of each of the vertices includes a plurality of data segments at respective positions, the processing unit being configured to:
analyse the data in the data block to determine a compression grouping scheme for grouping data segments of the vertices into segment blocks for compression;
group together data segments of the vertices according to the determined compression grouping scheme to form a plurality of segment blocks, the compression grouping scheme being determined such that each of the segment blocks includes a plurality of segment sets of one or more data segments of a respective plurality of the vertices, the segment sets having corresponding positions within the data of each of the plurality of the vertices;
compress at least one of the segment blocks; and
subsequent to compressing at least one of the segment blocks, use the segment blocks to form a compressed data block.

18. The system of claim 17 wherein the processing unit is further configured to select a compression algorithm based on the analysis of the data in the data block.

19. The system of claim 17 wherein the processing unit is configured to compress at least one of the segment blocks by compressing a first of the segment blocks using a first compression algorithm and compressing a second of the segment blocks using a second compression algorithm.

* * * * *